United States Patent
Vidunas et al.

(10) Patent No.: US 8,587,653 B1
(45) Date of Patent: Nov. 19, 2013

(54) MODIFYING THE RESOLUTION OF VIDEO BEFORE TRANSFERRING TO A DISPLAY SYSTEM

(75) Inventors: Joseph Vidunas, Aztec, NM (US); Derek Shoaf, Arvada, CO (US); Kurt Heier, Westminster, CO (US); William David Pardue, Dawsonville, GA (US)

(73) Assignee: Verint Systems, Inc., Santa Clara, CA (US)

( * ) Notice: Subject to any disclaimer, the term of this patent is extended or adjusted under 35 U.S.C. 154(b) by 827 days.

(21) Appl. No.: 12/771,168

(22) Filed: Apr. 30, 2010

Related U.S. Application Data (60) Provisional application No. 61/174,267, filed on Apr. 30, 2009, provisional application No. 61/256,117, filed on Oct. 29, 2009.

(51) Int. Cl.
*H04N 9/47* (2006.01)
*G06F 17/00* (2006.01)

(52) U.S. Cl.
USPC .......................................... 348/143; 715/273

(58) Field of Classification Search
None
See application file for complete search history.

(56) References Cited

U.S. PATENT DOCUMENTS

| | | | |
|---|---|---|---|
| 2003/0195964 A1* | 10/2003 | Mane | 709/227 |
| 2007/0024706 A1* | 2/2007 | Brannon et al. | 348/142 |
| 2009/0300701 A1* | 12/2009 | Karaoguz et al. | 725/119 |
| 2010/0111192 A1* | 5/2010 | Graves | 375/240.25 |

* cited by examiner

*Primary Examiner* — Peling Shaw
(74) *Attorney, Agent, or Firm* — Meunier Carlin & Curfman (57) ABSTRACT

Embodiments disclosed herein provide systems and methods reduce the resolution of video before transference to a display system. In a particular embodiment, a video processing system receives viewing parameters for a viewing area on a display system. The processing system also receives video of a scene comprising a quantity of pixels in each of a plurality of images of the scene. The processing system then modifies the video based on the viewing parameters to produce modified video having a reduced quantity of pixels in each of the plurality of images. The modified video is transferred for display of at least a portion of the scene in the viewing area by the display system.

18 Claims, 10 Drawing Sheets

MODIFYING THE RESOLUTION OF VIDEO BEFORE TRANSFERRING TO A DISPLAY SYSTEM

RELATED APPLICATIONS

This application hereby claims the benefit of and priority to U.S. Provisional Patent Application 61/174,267, titled "SERVER-SIDE SCALING AND ZOOMING", filed on Apr. 30, 2009, and U.S. Provisional Patent Application 61/256,117, titled "METHOD AND APPARATUS TO SCALE AND CROP LIVE VIDEO IMAGES", filed on Oct. 29, 2009, which are hereby incorporated by reference in their entirety.

TECHNICAL BACKGROUND

Video capture systems, such as video camera surveillance systems, capture video of various scenes. Video captured by a video capture system is captured at a resolution that may correspond to the video capture sensor in a video camera. The resolution of the video refers to the number of columns and rows of pixels that make up the image of the video. The higher the resolution of a video, the more pixels are in each image of the video. Consequently, more data is needed in a computer system to represent more pixels.

Many modern video cameras can capture video at resolutions greater than that which can be displayed by many modern display systems, such as computer monitors. The display system may be connected to a video capture system via a communication network, such as an Ethernet or Internet. The video capture system may transfer the captured video to a lower resolution display system. Since more data is needed to represent higher resolution video, it follows that more bandwidth is used to transmit the data of higher resolution video. Likewise, more processing is needed in the display system to allow the higher resolution video to be displayed on a lower resolution display.

Overview

Embodiments disclosed herein provide systems and methods to reduce the resolution of video before transference to a display system. In a particular embodiment, a method includes receiving viewing parameters for a viewing area on a display system and receiving video of a scene comprising a quantity of pixels in each of a plurality of images of the scene. The method further includes, modifying the video based on the viewing parameters to produce modified video having a reduced quantity of pixels in each of the plurality of images and transferring the modified video for display of at least a portion of the scene in the viewing area by the display system.

In some embodiments modifying the video based on the viewing parameters to produce the modified video comprises scaling a resolution of the video to a new resolution compatible with the viewing area on the display system.

In some embodiments scaling the resolution of the video to the new resolution comprises reducing the resolution of the video.

In some embodiments modifying the video based on the viewing parameters to produce the modified video comprises cutting pixels from the video.

In some embodiments modifying the video based on the viewing parameters to produce the modified video comprises zooming in on the portion of the scene in the video.

In some embodiments modifying the video based on the viewing parameters to produce the modified video comprises scaling a resolution of the video and cropping the video.

In some embodiments the video processing system segments each of the plurality of images into segments and wherein modifying the video comprises modifying each of the segments in each of the plurality of images and then reassembling the modified segments into the modified video.

In some embodiments the video processing system determines whether a second video processing system has excess processing capacity and transferring the video of the scene to the second video processing system to modify the video.

In some embodiments the video processing system receives the same viewing parameters for a second viewing area on a second display system and transferring the modified video for display of at least a portion of the scene in the second viewing area by the second display system.

In another embodiment, a video processing system receives viewing parameters for a viewing area on a display system. The processing system also receives video of a scene comprising a quantity of pixels in each of a plurality of images of the scene. The processing system then modifies the video based on the viewing parameters to produce modified video having a reduced quantity of pixels in each of the plurality of images. The modified video is transferred for display of at least a portion of the scene in the viewing area by the display system.

In a further embodiment, a video capture device is configured to capture video of a scene comprising a quantity of pixels in each of a plurality of images of the scene and transfer the video. A video processing system is configured to receive the video transferred by the video capture device and receive viewing parameters for a viewing area on a display system. The video processing system is further configured to modify the video based on the viewing parameters to produce modified video having a reduced quantity of pixels in each of the plurality of images and transfer over a network the modified video for display of at least a portion of the scene in the viewing area by the display system. The display system in communication with the video processing system over the network is configured to transfer the viewing parameters and receive the modified video. The display system is further configured to display the modified video.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
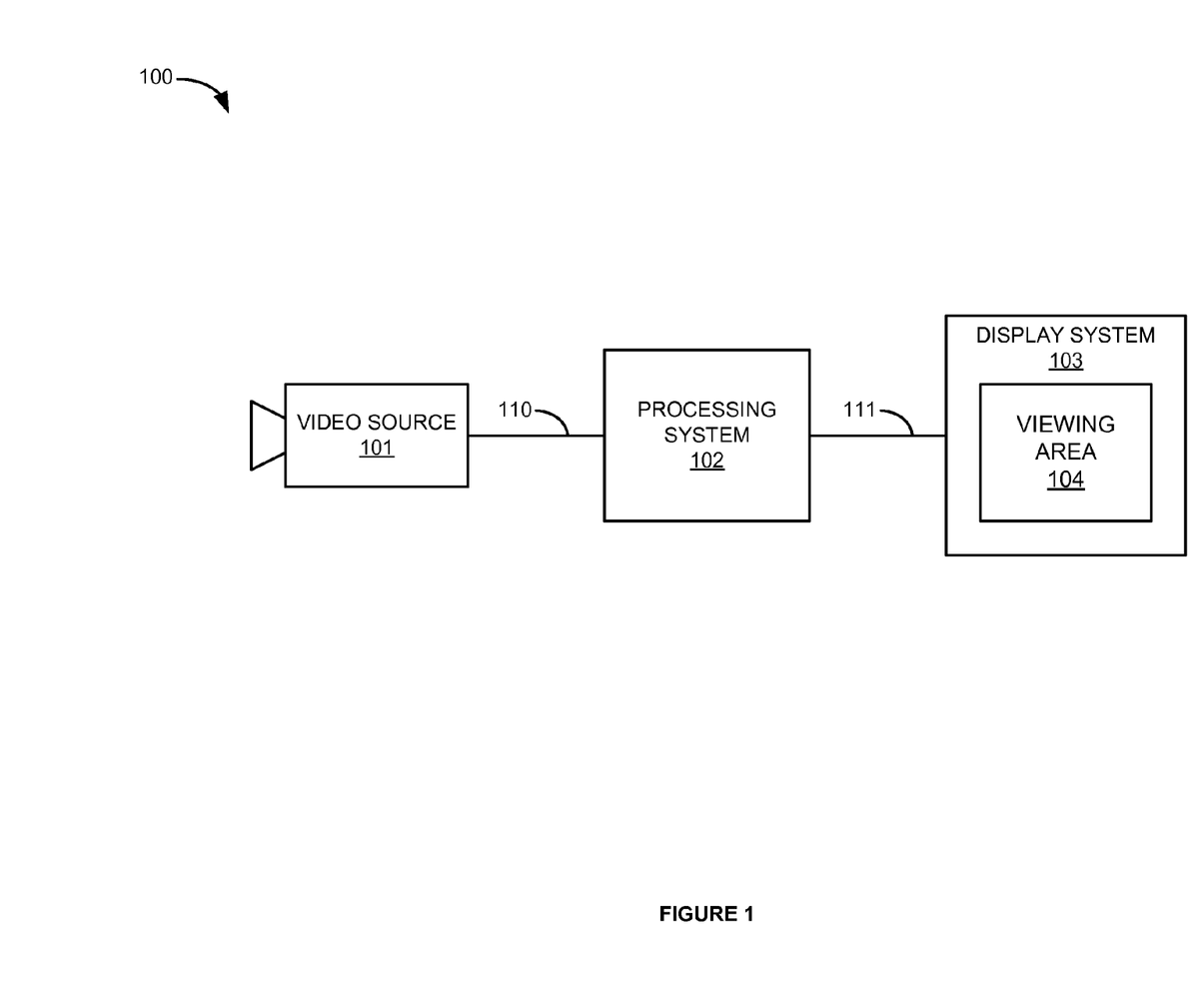
FIG. 1 illustrates a video capture and processing system.

FIG. 1 illustrates video capture and processing system 100. Video capture and processing system 100 includes video source 101, video processing system 102, display system 103, and viewing area 104. Video source 101 and processing system 102 communicate over link 110. Processing system 102 and display system 103 communicate over link 111.

Link 111 between processing system 102 and display system 103 may have limited bandwidth available for transferring video from processing system 102 to display system 103. Video transferred on link 111 will take up a certain amount of the available bandwidth. The higher the resolution of a video, the more bandwidth will be needed on link 111 to transfer the video because more data is needed to represent more pixels in higher resolution video. Additionally, viewing area 104 may be a lower resolution than a transferred video from processing system 102. Thus, display system may need to modify the transferred video to the resolution of viewing area 104 in order to allow the entire video image to fit within the resolution of viewing area 104. Therefore, the original video that is transferred uses more bandwidth than would the lower resolution video that is actually displayed in viewing area 104 and requires more processing power in display system 103 to be displayed in viewing area 104.

Figure 2:
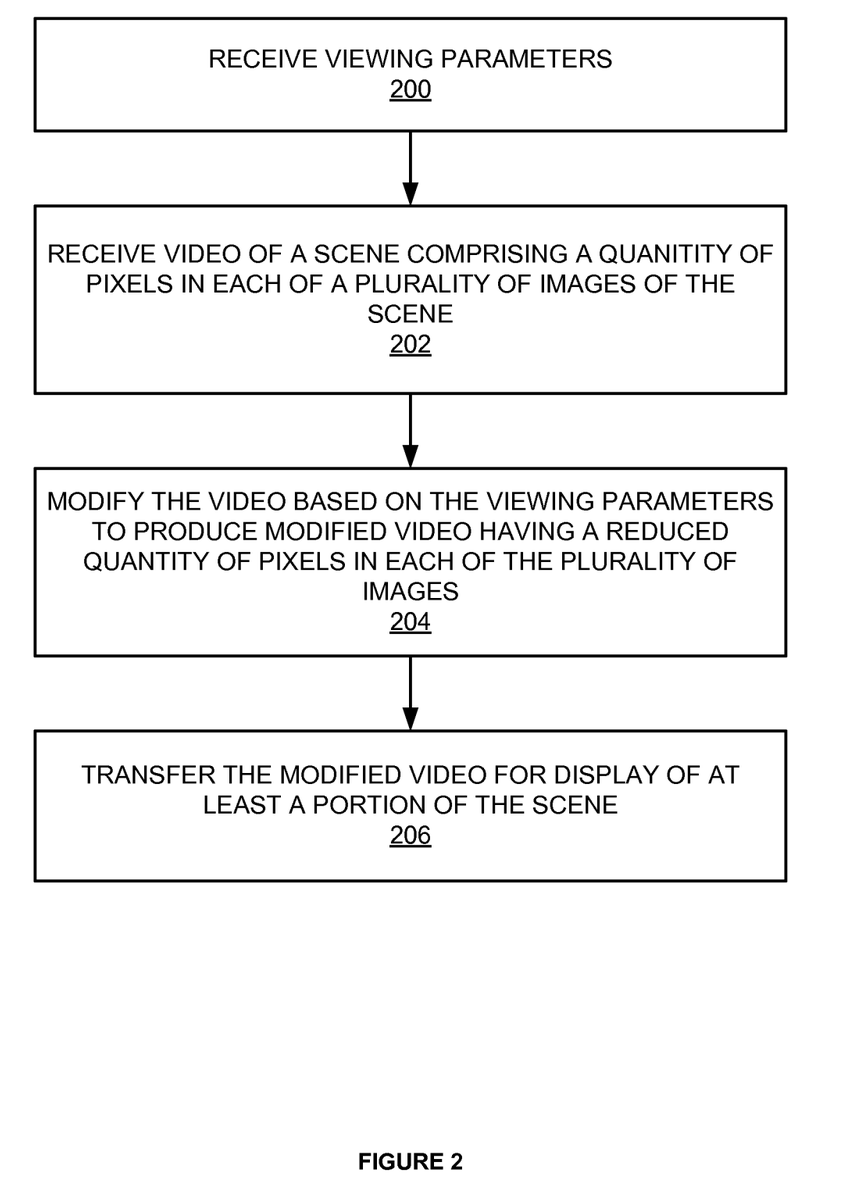
FIG. 2 illustrates the operation of a video capture and processing system.

FIG. 2 illustrates the operation of wireless communication system 100. The process begins with receiving viewing parameters (step 200). Processing system 102 may receive the viewing parameters for viewing area 104 on display system 103. Viewing area 104 may be the entirety of a display or it may be some smaller portion of the display, such as a segment of the display or a window in a graphical user interface. The viewing parameters may include a video source designation, a resolution of viewing area 104, a zoom level and location, any areas of the video image that should be cut from the video, or any other information pertinent to displaying video in viewing area 104. The viewing parameters may be a set constant for viewing area 104 of display system 103. For example, processing system 103 may be programmed to always modify video destined for viewing area 104 using the same preset viewing parameters or display system 103 always transfers the same viewing parameters for viewing area 104 to processing system 102. Alternatively, the viewing parameters may be dynamic or received from display system 103 in response to a user input. For example, a user may select a video scene from a presentation of multiple video scenes that opens a window for viewing area 104, which is then resized by the user to a desired resolution of the user.

The next step receives video of a scene comprising a quantity of pixels in each of a plurality of images of the scene (step 202). The scene may be received in processing system 102 from video source 103. The scene consists of whatever images the video source captures. The scene images may be of a location and whatever activities are occurring in that location. Processing system 102 may already be receiving video before receiving the viewing parameters or may start receiving video in response to receiving the viewing parameters. Additionally, processing system 102 may store the video in a storage system. Hence, the viewing parameters may either indicate a live video scene or a scene stored in the storage system to be transferred to display system 103.

After receiving the viewing parameters, the process modifies the video based on the viewing parameters to produce modified video having a reduced quantity of pixels in each of the plurality of images (step 204). Processing system 102 may modify the video by scaling the resolution down to the resolution indicated by the viewing parameters, by zooming into an area of the video scene indicated by the viewing parameters, or by cutting out areas of the video scene indicated by the viewing parameters. Each of these methods of pixel reduction is discussed further below regarding FIGS. 5-8. Additionally, processing system 102 may reduce other aspects of the video, such as color depth, to reduce the bandwidth needed to transfer the video.

After modifying the video, the modified video is transferred for display of at least a portion of the scene (step 206). Therefore, display system 103 receives the video from processing system 102 in a resolution corresponding to, or at least closer to, that of viewing area 104 so that the modified video can be displayed in viewing area 104. The modified video at a lower resolution uses less bandwidth on link 111 than the video at its original resolution. Additionally, it is no longer necessary for display system 103 to use as much processing power to modify the received video in order to display the received video in viewing area 104.

In some embodiments, processing system 102 may compress the modified video before transferring the modified video to display system 103 and, thereby, use even less bandwidth on link 111. Compression algorithms may include various algorithms, such as MPEG-2 and H.264, but may include any other form of video or data compression. Consequently, display system 103 may need to decode the compressed modified video in order to display the modified video in viewing area 104.

Referring back to FIG. 1, video source 101 comprises components capable of capturing video images of a scene. The components typically include a lens, image sensor, and a processor for interpreting the information received by the image sensor. Video source 101 may also include a user interface, memory device, software, processing circuitry, or some other components necessary for video source 101 to operate as described herein. Video source 101 may be a video camera, a computer web cam, a digital camera, or some other device capable of capturing video images—including combinations thereof.

Video processing system 102 comprises a computer system, a video interface, and a communication interface. Processing system 102 may also include other components such a router, server, data storage system, and power supply. Processing system 103 may reside in a single device or may be distributed across multiple devices. Processing system 103 is shown externally to video source 101, but system 102 could be integrated within the components of video source 101. Processing system 102 could be a multipurpose workstation, dedicated computer system, application server, or any other type of processing system—including combinations thereof.

Display system 103 comprises a processor based system that is capable of displaying video images in a viewing area on a display screen. Display system 103 may also include other components such a router, server, data storage system, and power supply. Display system 103 may be an liquid crystal display, cathode ray tube screen, multipurpose workstation, dedicated computer system, or any other type of system for viewing video images—including combinations thereof.

Communication links 110-111 use metal, glass, air, space, or some other material as the transport media. Communication links 110-111 could use various communication protocols, such as Time Division Multiplex (TDM), Internet Protocol (IP), Ethernet, communication signaling, Universal Serial Bus (USB), Firewire, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 110-111 could be a direct link or may include intermediate networks, systems, or devices.

Figure 3:
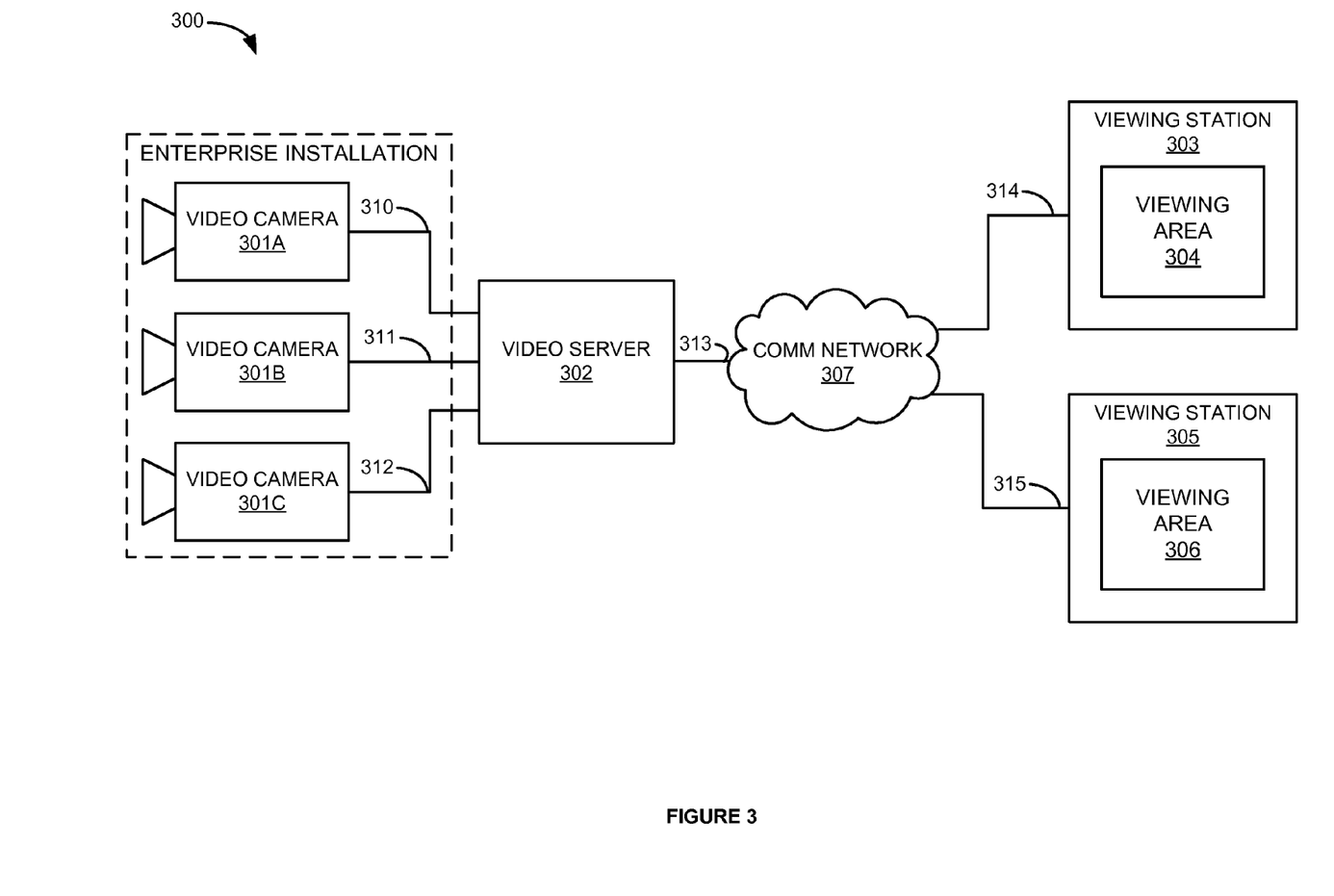
FIG. 3 illustrates a video capture and processing system.

FIG. 3 illustrates video capture and processing system 300. Video capture and processing system 300 includes video cameras 301, video server 302, viewing station 303, viewing station 304, display system 305, viewing area 306, and communication network 307. Video camera 301A and processing system 302 communicate over communication link 310. Video camera 301B and processing system 302 communicate over communication link 311. Video camera 301C and processing system 302 communicate over communication link 312. Processing system 302 and communication network 307 communicate over link 313. Communication network 307 and display system 303 communicate over link 314. Communication network 307 and display system 305 communicate over link 315.

Video cameras 301 are part of an enterprise installation. An enterprise installation may be a customer premises, such as a store location. Alternatively, the enterprise installation may include video cameras 301 being installed across multiple customer premises. Video server 302 may be part of the enterprise installation by being located at a customer premises along with one or more of video cameras 301.

Viewing stations 303 and 305 communicate with video server 302 over communication network 307. Communication network 307 may be any type of communication network, such as a local area network, wide area network, the Internet, or any other type of wired or wireless network. Consequently, viewing station 303 may be located in a different part of a customer premises or in a different geographic location than video server 302 or viewing station 305. Likewise, viewing stations 303 and 305 may execute application software that allows viewing stations 303 and 305 to receive viewing parameters from a user, communicate with video server 302, and display modified video from video server 302.

Figure 4:
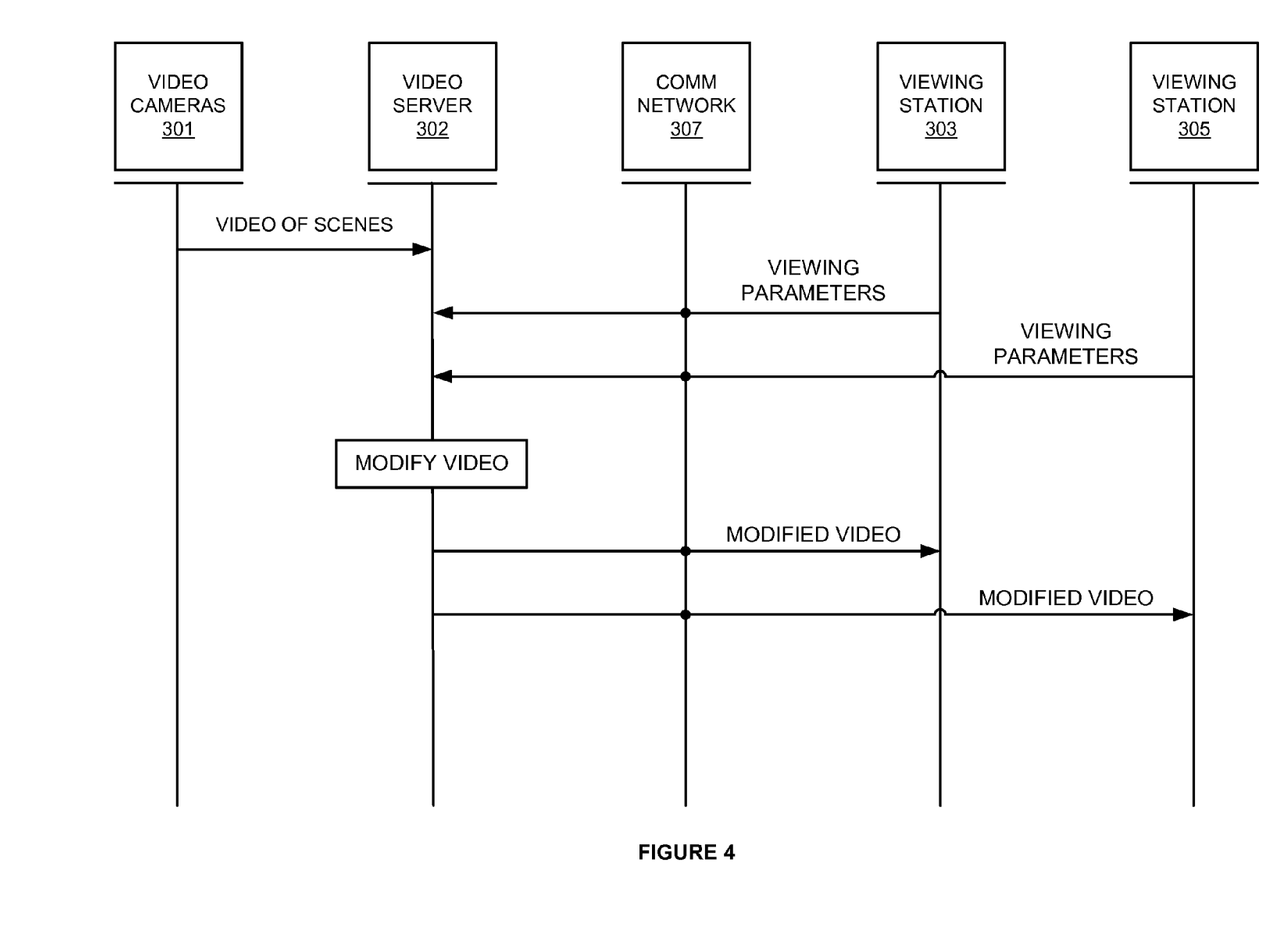
FIG. 4 illustrates the operation of a video capture and processing system.

FIG. 4 is a sequence diagram illustrating the operation of video capture and processing system 300. In this example, video cameras 301 are surveillance cameras capturing video scenes comprising a quantity of pixels in each of the plurality of images of each scene. Video cameras 301 transfer the captured video to video server 302. Video server 302 may save the video from each of video cameras 301 in a storage system for future reference. Then, video server 302 receives viewing parameters from viewing stations 303 and 305 via communication network 307. The viewing parameters may include a designation of video from which of video cameras 301 should be transferred, whether the video should be live video or recorded video from an indicated time in the past, a resolution of viewing areas 304 and 306, a zoom level and location, any areas of the video image that should be cut out, or any other information pertinent to displaying video in viewing areas 304 and 306. The viewing parameters may be a set constant for either of viewing areas 304 and 306 or viewing stations 303 and 305 may receive user inputs indicating the viewing parameters for viewing.

In response to receiving the viewing parameters, video server 302 modifies the video based on the viewing parameters from viewing stations 303 and 305 to produce modified video having a reduced quantity of pixels in each of the plurality of images. Video server 302 may modify the video by scaling the video, zooming the video, or cutting pixels out of the video.

The viewing parameters may differ for viewing areas 304 and 306 of viewing stations 303 and 305. For example, the viewing parameters for viewing area 304 may designate a scene captured by camera 301A at one resolution, while viewing parameters for viewing area 306 designate a scene captured by camera 301B at another resolution with an amount of zooming. In that situation, video server 302 modifies video separately based on the viewing parameters received from each of viewing stations 303 and 305. Thus, video server 302 scales the video from camera 301A to be transferred to viewing station 303 and zooms the video from camera 301B to be transferred to viewing station 305. Video server 302 then transfers each modified video over communication network 307 to viewing stations 303 and 305 respectively for display of at least a portion of the respective scenes in viewings areas 304 and 306.

Alternatively, the viewing parameters may be the same for viewing area 304 and 306. For example, both viewing parameters designate video from camera 301B and indicate the same resolution for viewing areas 304 and 306. In that situation, video server 302 may need to only scale the video stream once rather than separately for each set of viewing parameters, thus, saving the processing capacity of modifying the video twice. The modified video is then sent over communication network 307 to both viewing stations 303 and 305 for display of at least a portion of the scene in viewing areas 304 and 306. Similarly, the video server 302 may modify the video based on a compromise that video server 302 determines between the viewing parameters for viewing areas 304 and 306 that are not identical. Thus, the processing load on video server 302 is reduced while also reducing the processing load for viewing stations 303 and 305.

In some embodiments, video server 302 may receive additional viewing parameters each time viewing areas 304 and 306 change while video server 302 has yet to complete the transfer of the selected video. For example, while displaying the video, either of viewing areas 304 and 306 may change resolution. This may be the case if viewing areas 304 and 306 are windows in a graphical user interface, and a user changes the size of viewing areas 304 and 306. Video server 302 then modifies the video based on the new viewing parameters and continues to transfer the modified video to viewing stations 303 and 305.

In some embodiments, video server 302 may be accompanied by other video servers. The other video servers may be at the same location as video server 302 but may be located elsewhere, such as another customer premises, and communicate with video server 302 over communication network 307. Likewise, if the functionality of video server 302 is incorporated into one of video cameras 301, then the other video servers may be located in the other video cameras of video cameras 301. If video server 302 determines that video server 302 does not have the processing capacity to modify video for either viewing station 303 or 305, then video server 302 may distribute the video modification to one or more other video servers. To do so, video server 302 may first determine whether at least one of the other video servers has processing capacity available to perform video modification. Then video server 302 transfers the video to the available video server to modify and transfer the modified video to viewing stations 303 and 305.

In some embodiments, video server 302 may store, or receive from video cameras 301, multiple copies of the captured video at multiple resolutions. Video server 302 may then select the copy at the resolution that most matches the viewing parameters.

Figure 5:
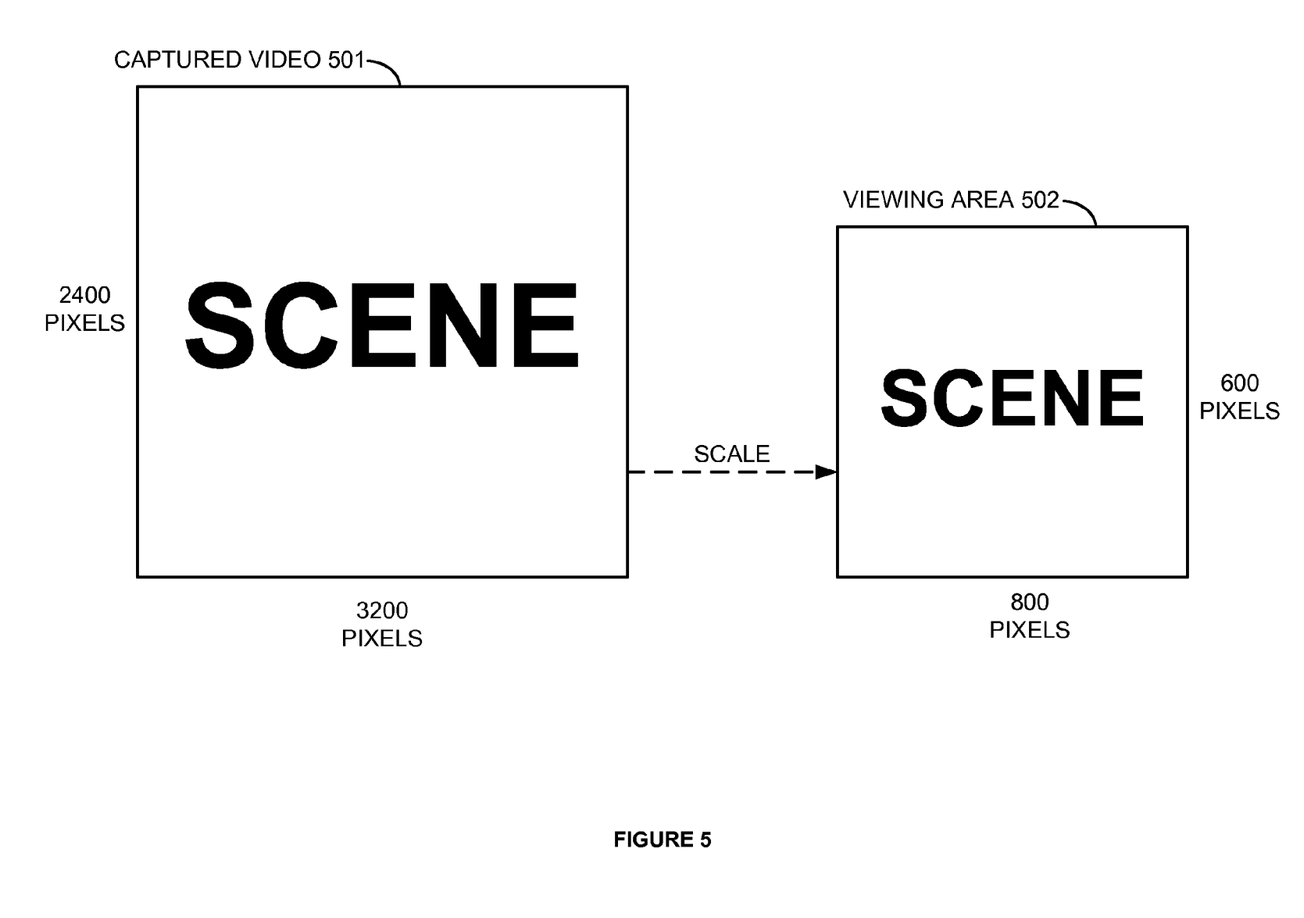
FIG. 5 illustrates scaling in an exemplary embodiment.

FIG. 5 illustrates scaling in an example of video modification to reduce the number of pixels in a video. A video processing system receives captured video 501 from a video source. For the purposes of this example the captured video 501 has a resolution of 3200 pixels wide by 2400 pixels in height, but may have any other resolution. Viewing area 502 has a resolution of 800 pixels wide by 600 pixels in height, but may have any other resolution. Captured video 501 contains images of a scene. Even though the captured scene is represented by the word "scene" in captured video 501, the scene may be images of a location along with any activities and things in that location. The processing system also receives viewing parameters for viewing area 502 from a display system. The viewing parameters indicate that the scene from captured video 501 is to be displayed in viewing area 502 and that the video should be scaled down to 800 pixels wide by 600 pixels in height.

In response to receiving the viewing parameters, the processing system modifies captured video 501 by scaling the resolution of the scene in captured video 501 down to the resolution of viewing area 502. Thus, the processing system may combine multiple pixels into a single pixel to produce lower resolution images of the captured video 501. The single pixel may be an average color of the multiple pixels from the higher resolution video or may use some other scaling algorithm.

Additionally, it may be necessary to modify the aspect ratio of the captured video 501 so that the full scene images can still be displayed in viewing area 502 if viewing area 502 has a different aspect ratio. For example, captured video 502 may be in a standard 4:3 aspect ratio while viewing area 502 may be a 16:10 aspect ratio computer monitor or 16:9 aspect ratio television monitor. Furthermore, if viewing area 502 is a window within a graphical user interface, then a user may be able to modify viewing area 502 to be an infinite number of aspect ratios. Therefore, the processing system may need to stretch the scaled video in either width or height in order to fit the aspect ratio of viewing area 502. Otherwise, the modified video may be displayed with the original aspect ratio in letterbox format within viewing area 502.

Figure 6:
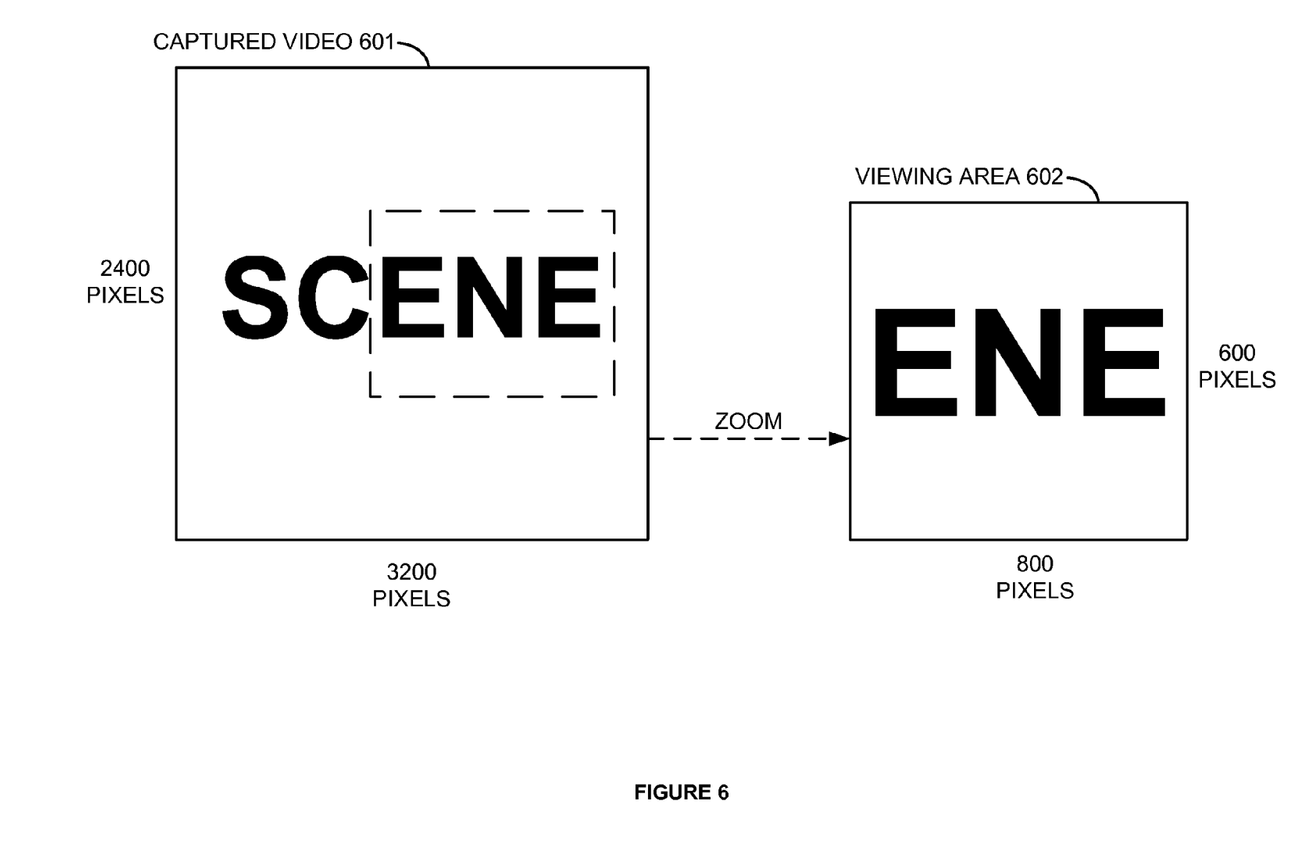
FIG. 6 illustrates zooming in an exemplary embodiment.

FIG. 6 illustrates zooming in an example of video modification to reduce the number of pixels in a video. A video processing system receives captured video 601 from a video source. For the purposes of this example the captured video 601 has a resolution of 3200 pixels wide by 2400 pixels in height, but may have any other resolution. Viewing area 602 has a resolution of 800 pixels wide by 600 pixels in height, but may have any other resolution. Captured video 601 contains images of a scene. Even though the captured scene is represented by the word "scene" in captured video 601, the scene may be images of a location along with any activities and things in that location. The processing system also receives viewing parameters for viewing area 602 from a display system. The viewing parameters indicate that the scene from captured video 601 is to be displayed in viewing area 602, that the video should be zoomed into a location of capture video 601 indicated by the dashed rectangle, and that viewing area 602 is 800 pixels wide by 600 pixels in height. A user of the display system may indicate the area encompassed by the dashed rectangle for inclusion with the viewing parameters. For example, viewing area 502 may first display a scaled version of the full video scene. The user may then indicate a part of the scene for zooming on viewing area 502.

In response to receiving the viewing parameters, the processing system modifies captured video 601 by zooming in on captured video 601. The processing system may use a process called digital zooming. Digital zooming crops a section of pixels out of out of the images of captured video 601. For example, digital zooming crops the pixels within the dashed rectangle out of captured video 601. Thus, the amount of pixels within the dashed rectangle stays the same while all the pixels outside the dashed rectangle are removed for the modified video.

In some examples, the dashed rectangle may encompass the number of pixels of captured video 601 that correspond to the resolution of viewing area 602. Thus, the processing system need only crop the enclosed pixels out of captured video 601 then transfer the modified video for display in viewing area 602. In other examples, the dashed rectangle may encompass a number of pixels of captured video 601 that does not correspond to the resolution of viewing area 602. Thus, the processing system may crop the enclosed pixels then scale the remaining pixels to the resolution of viewing area 602. Additionally, the processing system may need to modify the zoomed video in order to correct differences in aspect ratio between the enclosed pixels and viewing area 602.

In some embodiments, the viewing parameters may indicate some event or item in a scene for which the processing system should monitor. For example, the processing system may be instructed to monitor for faces. Upon detecting the event or item, the processing system may automatically crop and scale the area of the video scene where the event or item was detected.

Figure 7:
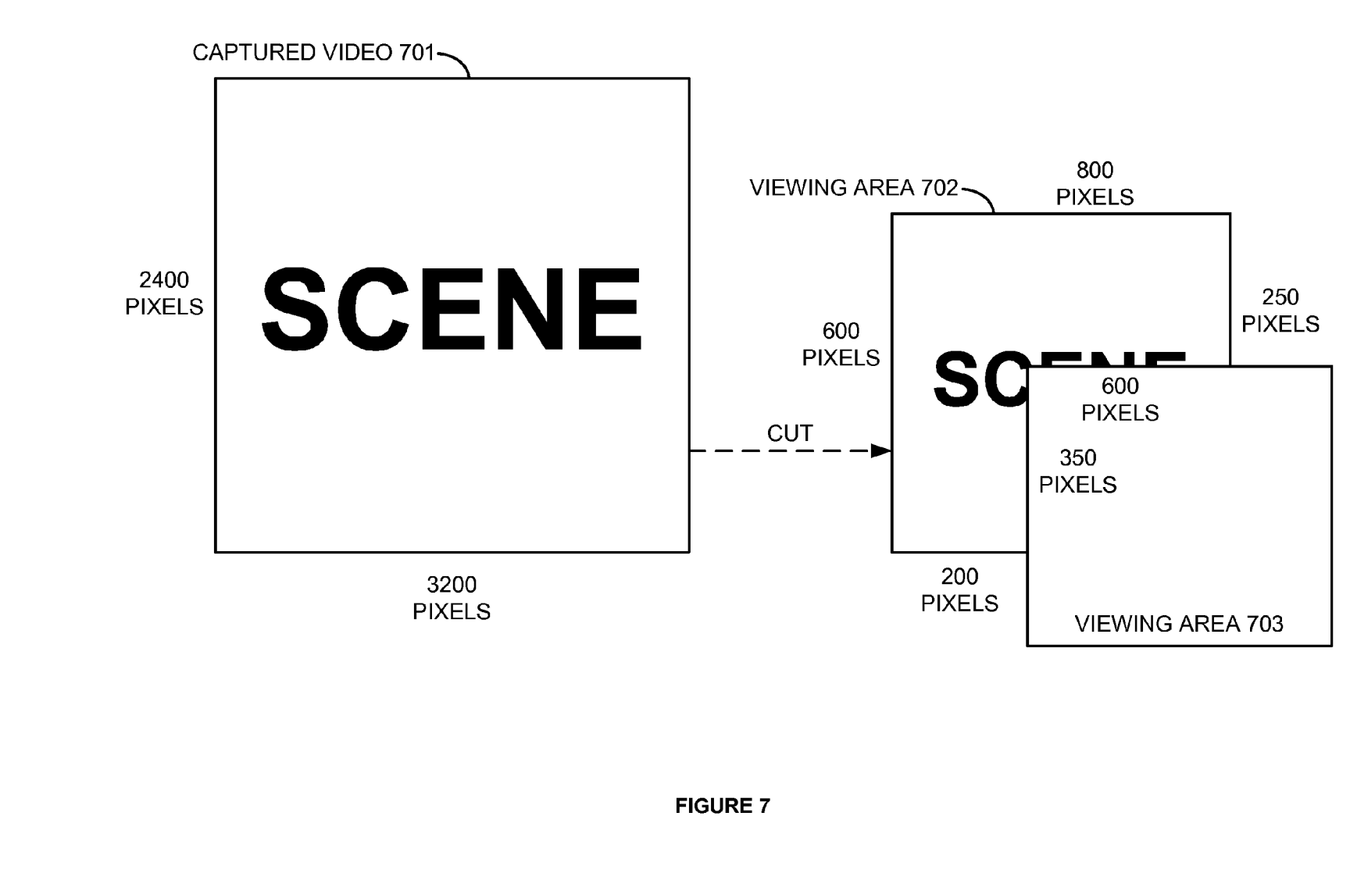
FIG. 7 illustrates cutting in an exemplary embodiment.

FIG. 7 illustrates cutting out pixels in an example of video modification to reduce the number of pixels in a video. A video processing system receives captured video 701 from a video source. For the purposes of this example the captured video 701 has a resolution of 3200 pixels wide by 2400 pixels in height, but may have any other resolution. Viewing area 702 has a resolution of 800 pixels wide by 600 pixels in height, but may have any other resolution. Captured video 701 contains images of a scene. Even though the captured scene is represented by the word "scene" in captured video 701, the scene may be images of a location along with any activities and things in that location. In this example, viewing area 702 is partially obscured by viewing area 703, but may also be obscured for any other reason. Viewing area 703 may be another viewing window for viewing other captured video but may also be any other window in a graphical user interface. Additionally, a user may indicate a portion of captured video 501 that should be cut. The processing system receives viewing parameters for viewing area 702 from a display system. The viewing parameters indicate that the scene from captured video 701 is to be displayed in viewing area 702, that captured video 602 should be scaled to viewing area 602 that is 800 pixels wide by 600 pixels in height, and that a 600 pixel wide by 350 pixel in height section of viewing area 702 should be cut.

In response to receiving the viewing parameters, the processing system modifies captured video 701 by scaling captured video 701 to the size of viewing area 702. The processing system further cuts the 600 by 350 pixel section of the scaled video that is obscured by viewing area 703. The processing system then transfers the modified video for display on viewing area 702.

Figure 8:
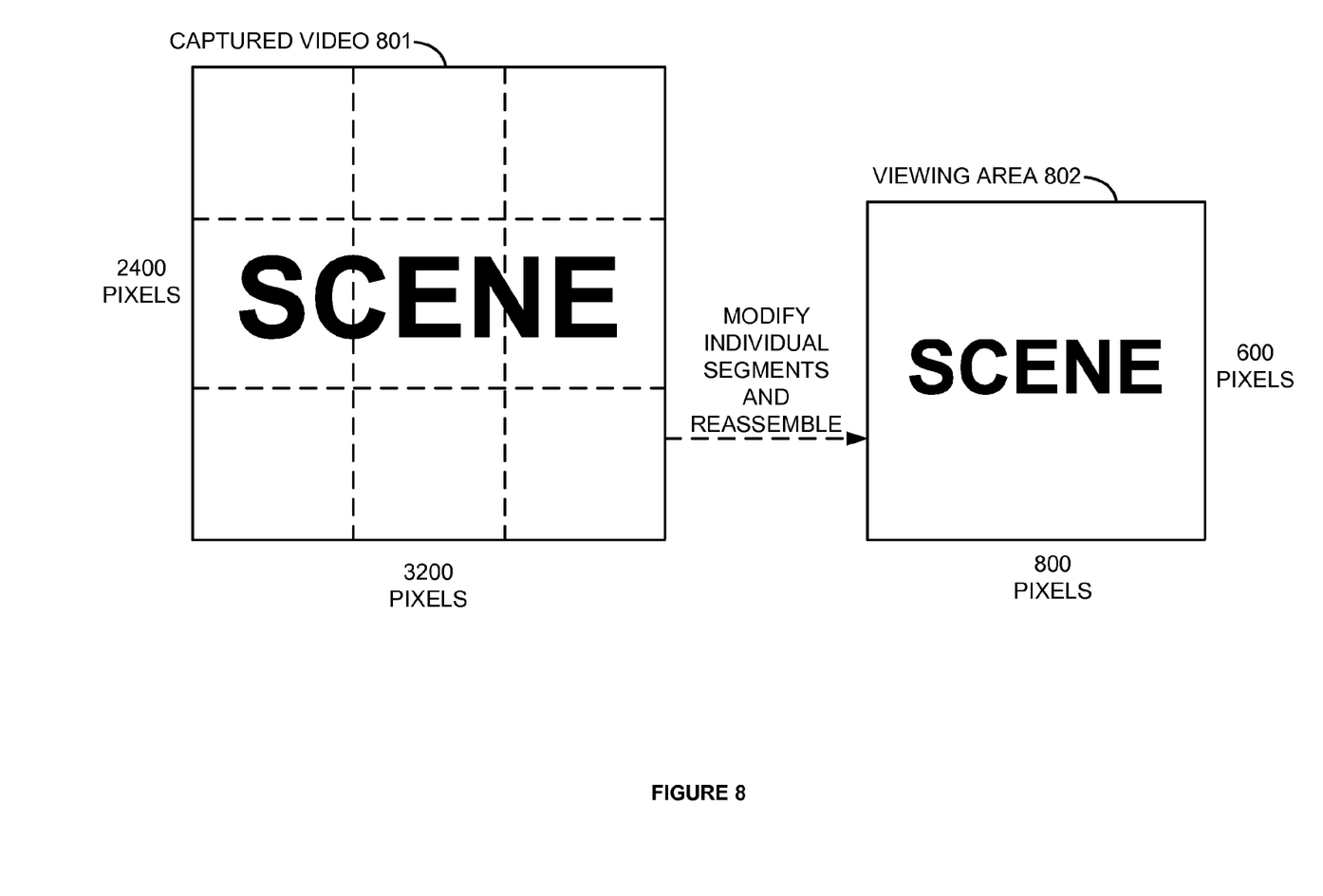
FIG. 8 illustrates segmenting in an exemplary embodiment.

FIG. 8 illustrates segmentation of video images in an example of modifying video to reduce the number of pixels. In this example, a processing system segments the captured video 801 into multiple pieces as indicated by the dashed lines crossing captured video 801. The video may be segmented to aid in processing the video to a set of viewing parameters, such as resolution and compression requirements. While this example shows captured video 801 segmented into nine pieces of about equal size, the processing system may segment captured video 801 into any number of pieces at any size.

After segmenting the video, the processing system modifies each individual segment with respect to received viewing parameters for viewing area 802. After modifying the individual segments, the processing system reassembles the segments into a full video image and transfers the video for display in viewing area 802.

In some embodiments multiple video processing systems may be present. In those embodiments one video processing system may transfer one or more of the video image segments to other video processing systems for processing. The processing system may do this because the processing system does not have the spare processing capacity to perform the modification itself and determined that other processing systems have the spare processing capacity to perform the video modifications.

Figure 9:
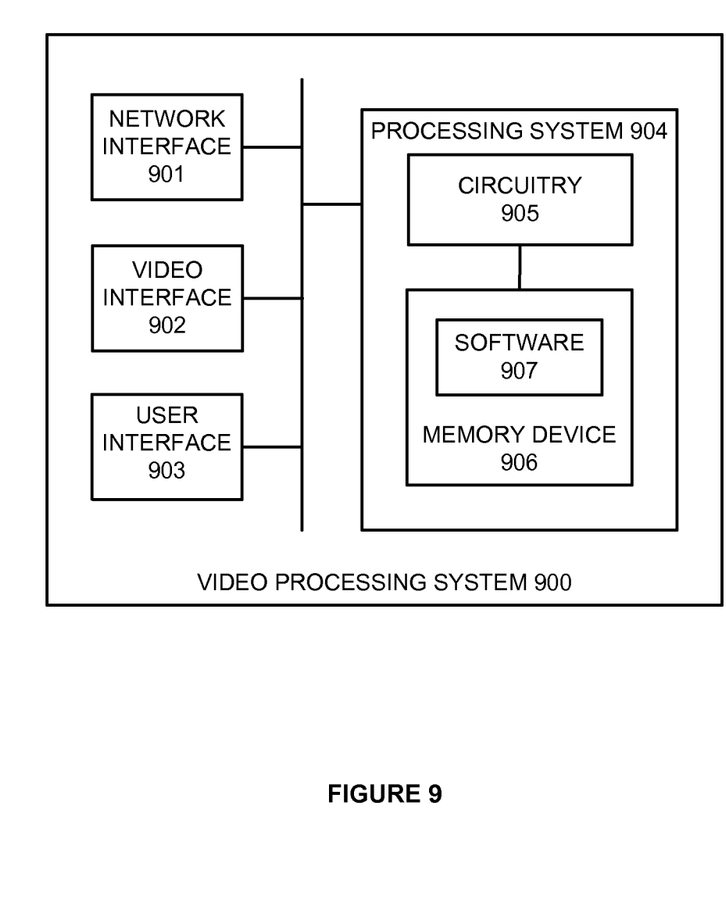
FIG. 9 illustrates a video processing system.

FIG. 9 illustrates video processing system 900. Video processing system 900 is an example of video processing system 102 and video server 302, although video processing system 102 and video server 302 may use alternative configurations. Video processing system 900 comprises network interface 901, video interface 902, user interface 903, and processing system 904. Processing system 904 is linked to network interface 901, video interface 902 and user interface 903. Processing system 904 includes processing circuitry 905 and memory device 906 that stores operating software 907.

Network interface 901 comprises components that communicate over communication links, such as network cards, ports, RF transceivers, processing circuitry and software, or some other communication devices. Network interface 901 may be configured to communicate over metallic, wireless, or optical links. Network interface 901 may be configured to use TDM, IP, Ethernet, optical networking, wireless protocols, communication signaling, or some other communication format—including combinations thereof.

Video interface 902 comprises components that communicate with video sources, such as USB, Firewire, computer data bus, or some other interface capable of communicating with a video source. Alternatively, if video processing system 900 is integrated into a video source, then video interface 902 may connect processing system 904 with a video capture apparatus, such as a image capture sensor.

User interface 903 comprises components that interact with a user. User interface 903 may include a keyboard, display screen, mouse, touch pad, or some other user input/output apparatus. User interface 903 may be omitted in some examples.

Processing circuitry 905 comprises microprocessor and other circuitry that retrieves and executes operating software 907 from memory device 906. Memory device 906 comprises a disk drive, flash drive, data storage circuitry, or some other memory apparatus. Operating software 907 comprises computer programs, firmware, or some other form of machine-readable processing instructions. Operating software 907 may include an operating system, utilities, drivers, network interfaces, applications, or some other type of software. When executed by circuitry 905, operating software 907 directs processing system 903 to operate video processing system 900 as described herein.

In particular, operating software 907 directs processing system 904 to receive viewing parameters through network interface 901 for a viewing area on a display system. Additionally, processing system 904 is directed to receive video of a scene comprising a quantity of pixels in each of a plurality of images of the scene through video interface 902. Alternatively, video may be received over a network through network interface 901. After receiving the viewing parameters, processing system 904 is directed to modify the video based on the viewing parameters to produce modified video having a reduced quantity of pixels in each of the plurality of images. Processing system 904 then uses network interface 901 to transfer the modified video for display of at least a portion of the scene in the viewing area by the display system.

Figure 10:
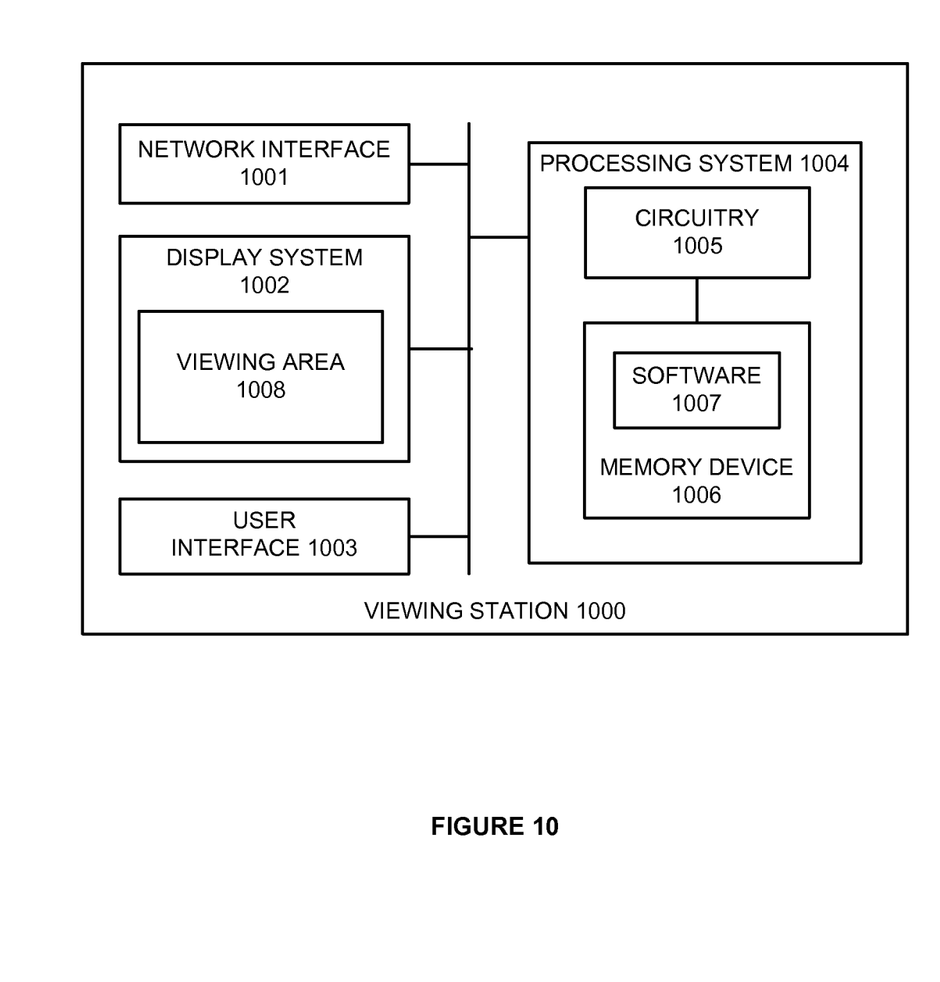
FIG. 10 illustrates a display system.

FIG. 10 illustrates viewing station 1000. Communication control system 1000 is an example of viewing stations 303 and 305, although viewing stations 303 and 305 may use alternative configurations. Communication control system 1000 comprises network interface 1001, display system 1002, user interface 1003, and processing system 1004. Display system 1002 displays viewing area 1008. Processing system 1004 is linked to network interface 1001, display system 1002, and user interface 1003. Processing system 1004 includes processing circuitry 1005 and memory device 1006 that stores operating software 1007.

Network interface 1001 comprises components that communicate over communication links, such as network cards, ports, RF transceivers, processing circuitry and software, or some other communication devices. Network interface 1001 may be configured to communicate over metallic, wireless, or optical links. Network interface 1001 may be configured to use TDM, IP, Ethernet, optical networking, wireless protocols, communication signaling, or some other communication format—including combinations thereof.

Display system 1002 comprises components that are capable of displaying video in viewing area 1008. Display system 1002 may be a liquid crystal display, an organic light emitting diode display, a cathode ray tube monitor, or any other type of display monitor. Display system 1002 may be built into viewing station 1000 but may also be connected to viewing station 1000 by interfaces such as VGA, DVI, HDMI, Display Port, or any other type of display connection format. Viewing area may be the entirety of the screen area of display system 1002, but may also be a smaller fraction of the screen area, such as a window in a graphical user interface displayed on display system 1002.

User interface 1003 comprises components that interact with a user. User interface 1003 may include a keyboard, touch screen, mouse, touch pad, or some other user input/output apparatus. User interface 1003 may be omitted in some examples.

Processing circuitry 1005 comprises microprocessor and other circuitry that retrieves and executes operating software 1007 from memory device 1006. Memory device 1006 comprises a disk drive, flash drive, data storage circuitry, or some other memory apparatus. Operating software 1007 comprises computer programs, firmware, or some other form of machine-readable processing instructions. Operating software 1007 may include an operating system, utilities, drivers, network interfaces, applications, or some other type of software. When executed by circuitry 1005, operating software 1007 directs processing system 1003 to operate viewing station 1000 as described herein.

In particular, operating software 1007 directs processing system 1004 to receive viewing parameters from a user via user interface 1003 for viewing area 1008 on video display 1002. Network interface 1001 is instructed by processing system 1004 to transfer the viewing parameters to a video processing system. Network interface 1001 then receives video modified based on the viewing parameters from the video processing system. Display system 1002 displays at least a portion of the scene in viewing area 1008 described by the viewing parameters.

Although, not depicted in drawings, further aspects of the invention may relate to the following discussion.

Recently as IP cameras have replaced traditional analog cameras for video surveillance, camera manufacturers have begun offering cameras in a wide variety of resolutions ranging up to several megapixels. The amount of CPU resources required to decompress images is directly proportional to the image resolution, so as image resolution has increased, so have the processing requirements to decompress images. Similarly, the network bandwidth required to transmit images increases as the resolution increases.

During live monitoring, it is not unusual for an observer to display several live camera views simultaneously. Common window layouts include 2×2, 3×3, and 4×4 arrangements (where 4×4 means 4 rows and 4 columns of windows for a total of 16 camera views displayed simultaneously.

When viewing multiple windows in a tiled window layout, as more windows are displayed simultaneously each individual window must be reduced in size. In a 4×4 window layout, each window is exactly ¼ of the size of the windows in a 2×2 window layout.

Instead of displaying multiple windows in a tiled layout, it is also possible for users to open multiple overlapping video windows. In that case, portions of some windows will be hidden by overlapping windows. No matter how windows are arranged, the total number of live video pixels visible to the user can never exceed the total number of pixels in the current screen resolution.

Scale and Crop Images to Match the Visible Client Window:

In order to reduce the client workstation CPU utilization required to decompress high resolution images, megapixel surveillance cameras should scale and crop live images to match the window in which the image will be displayed. Examples:

If a user is displaying a 4×4 tiled window layout and the screen resolution is 1920×1200 pixels, then each window can be approximately 400×300 to maintain the 4:3 aspect ratio. If the original images from a camera are 8 megapixel images (3200×2400) but the client is currently displaying images in a window whose size is 400×300 pixels, the camera should scale the images down to 400×300 before compression. Scaling the images before compression will dramatically reduce the bandwidth required to transmit the compressed images, and it will reduce the CPU power required to decompress the images on the workstation.

If a user is displaying multiple overlapping video windows, the client application should request scaled and cropped images that match the visible region of the window. For example, a video window might be 400×300 pixels in size, but the window might also be mostly hidden by another window, so that only 3 rows of pixels are visible. After scaling images to 400×300, the camera should mask off (clear) or discard all but the 3 visible rows of pixels. Instead of compressing and transmitting a 400×300 image, the camera would instead compress and transmit a 400×3 image.

For example, the original image is an 8 megapixel panoramic image 6400 pixels wide and 1200 pixels in height and the user wants to display a single full image on screen. To display the entire image when the screen resolution is 1920×1200, the image would be scaled to 1920×360. The camera should scale the images to 1920×360 before compressing the images and transmitting them to the client.

Starting with the previous example, let's say the user zooms in on a portion of the image so that the height of the displayed image expands to the full 1200 pixel screen height. Now the displayed image height exactly matches the original captured image resolution. However, the screen resolution only allows the displayed width to reach 1920 pixels. The camera should crop the images to 1920×1200 before compressing and transmitting the images.

Starting with the previous example, if the user zooms in any further the displayed image will be pixellated, which means each single pixel from the original image will be displayed as a block of pixels on the screen where all of the displayed pixels will be the same color as the pixel from the original image. In this case, the camera should crop the images so that only pixels visible to the user will be compressed and transmitted. The small transmitted image will be stretched to larger display size when displayed by the client application. That is, in this case the transmitted resolution will be lower than the displayed resolution.

Multi-streaming and Resource Limits:

In order to support this idea of tailoring live video images for each client, the first requirement is that the IP camera must support multi-streaming. One set of images will be compressed and stored in files on disk in order to be available for playback of recorded video. If images are scaled and cropped for live video, that means the live images won't exactly match the recorded images—the live images must be processed separately from the recorded images. The ability to generate and transmit more than one set of compressed images from the original uncompressed images is called multi-streaming.

Each camera can support a finite number of simultaneous live video requests because of two finite resources:

Bandwidth. Each camera has a finite total network bandwidth available to transmit live images to clients via unicast transmission. When a large number of clients need to be able to receive live video simultaneously, multicast transmission can be used if the network routers support it. When multicast is used, each client receives exactly the same images so scaling and cropping for individual clients would not be possible.

CPU. If the camera scales, crops, and compresses images separately for each individual client, then CPU utilization will increase as more clients simultaneously request live video. If the camera tries to compress each image too many times in order to tailor images to several different clients with different window sizes, eventually the time required to compress images for all clients may exceed the available time between images. As more clients request images, the camera may be forced to reduce the image refresh rate, and video latency may increase to an unacceptable level (where latency is a delay between when the image is captured and when the image is displayed on a client workstation).

Solutions for Resource Limits:

Solution 1: Group client requirements. If two or more clients are requesting video images scaled to a size that is similar but not exactly the same, the camera could produce a single stream of compressed images that can be transmitted to all clients in the group. Each client may need to perform additional scaling or cropping before displaying the images, because the images will not be tailored exactly to the requirements of each client. If the camera has sufficient CPU resources to compress two sets of images for live video clients, then the camera would group simultaneous requests into no more than two client groups. The client grouping concept could also be applied to multicast streaming. A camera could stream live video images to two or more multicast addresses where each address is intended to satisfy the requirements of one group of clients.

Solution 2: Collaborate with one or more servers or other cameras. While several clients are requesting live video from one camera, there may be other cameras in the same system that currently do not have any live video requests. In that case, cameras could collaborate to share processing power and network bandwidth. For example, an overloaded camera could stream one set of images to another camera. The other camera would decompress the incoming images and then scale, crop, and recompress the images to meet the needs of one or more clients or groups of clients. Instead of using other IP cameras for this purpose, another approach would be for cameras to collaborate with one or more servers (or NVRs) on the network that provide bandwidth and CPU resources for scaling, cropping, and compression of live video images.

In some cases, this type of collaboration might be needed for bandwidth only—the other camera or server might only need to forward images to multiple destination addresses. For example, the original camera has enough network bandwidth available for unicast transmission to 5 clients. Camera 6 can transmit images to 6 clients in various ways. One way would be to transmit images to 4 clients and to one other camera or server. The other camera or server would forward the images to two clients for a total of 6 recipients.

For PTZ cameras, it is important to minimize live video latency when a user is manually controlling the camera. The IP camera should be aware when a live video request corresponds to the user that is currently controlling the camera. The IP camera should make choices that will minimize live video latency to that particular user.

Leverage Knowledge of Network Connections:

In order to intelligently manage network bandwidth utilization, video system components must take into account the bandwidth available between different nodes of the network. For example, if five different workstations on the same LAN as the camera are requesting live video, then the camera can use unicast transmission to stream images to each individual client. However, if four workstations that are requesting live video are located at a remote site separated from the camera by a low bandwidth WAN connection, then unicast to each client would not be the best strategy to optimize bandwidth utilization. If the camera knows that four clients are on the same LAN but that LAN is separated from the camera by a slow WAN connection, then the camera should place those clients into a single group for the purpose of scaling and cropping images. The camera should select an image scaling and cropping strategy that will meet the needs of all clients in the group. The camera should stream images to a single node on the remote LAN, and then that node should arrange for images to be forwarded to the other nodes that have requested them. Only one set of images will need to traverse the slow WAN connection.

One approach would be to stream the images to one client on the remote LAN and then have that client forward the images to the other clients. To forward images to a large number of destination addresses on the remote LAN, clients could be organized into a tree structure where the first recipient forwards images to 4 other recipients, each of those forwards the images to 4 more, etc.

Another approach would be to stream the images to a server at the remote site, and then the server would stream the images to the recipients on that LAN. When a server is used, it would be possible for the server to decompress the images and then scale, crop, and recompress the images to tailor the images to exactly meet the requirements of individual requesters. For example, one client on the remote LAN might be displaying live video in a single full-screen window, while other clients on the same LAN are displaying live video in a 4×4 tiled window layout.

A server on the same LAN with the camera may be responsible for managing video streaming to remote sites that require the use of a WAN connection. In that case, the camera will send a single stream of images to the server, and then the server will stream images to remote sites (either directly to a client workstation or to a server at the remote site, as described above). Using a single server to manage a WAN connection allows the server to coordinate and prioritize simultaneous video traffic from multiple cameras.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a video processing system, the method comprising:
   receiving viewing parameters for plural viewing areas, each viewing area being associated with a respective one of plural display systems;
   receiving video of a scene comprising a quantity of pixels in each of a plurality of images of the scene;
   grouping the plural display systems in accordance with the viewing parameters into groups of display systems having similar viewing parameters;
   modifying the video based on the viewing parameters of the groups of display systems to produce modified video for each group of display systems, the modified video having a reduced quantity of pixels in each of the plurality of images; and
   transferring the modified video to each group of display systems for display of at least a portion of the scene in the viewing area by members of each group of display systems.

2. The method of claim 1 wherein modifying the video based on the viewing parameters to produce the modified video comprises scaling a resolution of the video to a new resolution compatible with the viewing area on the display system.

3. The method of claim 2 wherein scaling the resolution of the video to the new resolution comprises reducing the resolution of the video.

4. The method of claim 1 wherein modifying the video based on the viewing parameters to produce the modified video comprises cutting pixels from the video.

5. The method of claim 1 wherein modifying the video based on the viewing parameters to produce the modified video comprises zooming in on the portion of the scene in the video.

6. The method of claim 1 wherein modifying the video based on the viewing parameters to produce the modified video comprises scaling a resolution of the video and cropping the video.

7. The method of claim 1 further comprising segmenting each of the plurality of images into segments and wherein modifying the video comprises modifying each of the segments in each of the plurality of images and then reassembling the modified segments into the modified video.

8. The method of claim 1 further comprising determining whether a second video processing system has excess processing capacity and transferring the video of the scene to the second video processing system to modify the video.

9. A video processing system comprising:
   a network interface configured to receive viewing parameters for plural viewing areas, each viewing area being associated with a respective one of plural display systems;

a video interface configured to receive video of a scene comprising a quantity of pixels in each of a plurality of images of the scene;

a processor configured to group the plural display systems in accordance with the viewing parameters into groups of display systems having similar viewing parameters, and to modify the video based on the viewing parameters of the groups of display systems to produce modified video for each group of display systems, the modified video having a reduced quantity of pixels in each of the plurality of images; and the network interface configured to transfer the modified video to each group of display systems for display of at least a portion of the scene in the viewing area by members of each group of display systems.

10. The video processing system of claim 9 wherein the processing system is configured to modify the video based on the viewing parameters to produce the modified video by scaling a resolution of the video to a new resolution compatible with the viewing area on the display system.

11. The video processing system of claim 10 wherein scaling the resolution of the video to the new resolution comprises reducing the resolution of the video.

12. The video processing system of claim 9 wherein the processing system is configured to modify the video based on the viewing parameters to produce the modified video by cutting pixels from the video.

13. The video processing system of claim 9 wherein the processing system is configured to modify the video based on the viewing parameters to produce the modified video by zooming in on the portion of the scene in the video.

14. The video processing system of claim 9 wherein the processing system is configured to modify the video based on the viewing parameters to produce the modified video by scaling a resolution of the video and cropping the video.

15. The video processing system of claim 9 wherein the processing system is further configured to segment each of the plurality of images into segments and modify the video by modifying each of the segments in each of the plurality of images and then reassemble the modified segments into the modified video.

16. The video processing system of claim 9 wherein the processing system is further configured to determine whether a second video processing system has excess processing capacity and the network interface is further configured to transfer the video of the scene to the second video processing system to modify the video.

17. A video capture and processing system comprising:
a video capture device configured to capture video of a scene comprising a quantity of pixels in each of a plurality of images of the scene and transfer the video;
a video processing system configured to receive the video transferred by the video capture device, receive viewing parameters for plural viewing areas, each viewing area being associated with a respective one of plural display systems, group the plural display systems in accordance with the viewing parameters into groups of display systems having similar viewing parameters, modify the video based on the viewing parameters of the groups of display systems to produce modified video for each group of display systems, the modified video having a reduced quantity of pixels in each of the plurality of images, and transfer over a network the modified video to each group of display systems for display of at least a portion of the scene in the viewing area by members of each group of display systems; and
the plural display systems in communication with the video processing system over the network and configured to transfer the viewing parameters, receive the modified video, and display the modified video.

18. The video capture and processing system of claim 17 wherein the video processing system is further configured to determine whether a second video processing system has excess processing capacity and transfer the video of the scene to the second video processing system to modify the video if the video processing system does not have enough processing capacity to modify the video.

* * * * *